United States Patent
Sood et al.

(10) Patent No.: US 10,972,896 B2
(45) Date of Patent: Apr. 6, 2021

(54) INTELLIGENT STEERING OF ROAMING FOR USER EQUIPMENT

(71) Applicant: T-MOBILE USA, INC., Bellevue, WA (US)

(72) Inventors: Romil Sood, Bellevue, WA (US); Boris Antsev, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/674,842

(22) Filed: Nov. 5, 2019

(65) Prior Publication Data

US 2020/0236527 A1 Jul. 23, 2020

Related U.S. Application Data

(60) Provisional application No. 62/795,924, filed on Jan. 23, 2019.

(51) Int. Cl.
*H04W 8/04* (2009.01)
*H04W 8/20* (2009.01)
*H04W 60/00* (2009.01)

(52) U.S. Cl.
CPC .......... *H04W 8/04* (2013.01); *H04W 8/20* (2013.01); *H04W 60/00* (2013.01)

(58) Field of Classification Search
CPC ......... H04W 8/04; H04W 60/00; H04W 8/20; H04W 8/02; H04W 8/065; H04W 8/08; H04W 88/00; H04W 88/02; H04W 88/08; H04W 64/003; H04W 60/005; H04W 60/02; H04W 60/04; H04W 60/06; H04W 36/00; H04W 36/0083; H04W 48/18; H04W 8/06; H04W 8/18; H04W 8/00; H04W 8/16; H04W 8/12; H04W 8/10; H04W 4/50; H04W 8/24; H04W 8/245;
(Continued)

(56) References Cited

U.S. PATENT DOCUMENTS 8,254,916 B2 * 8/2012 Jessen et al. .......... 455/432.1
8,391,859 B1 * 3/2013 Pulugurta .............. 455/433
(Continued)

FOREIGN PATENT DOCUMENTS

EP        1463366 A2      9/2004
WO    WO-2019017689 A1   1/2019

OTHER PUBLICATIONS

International Search Report for PCT/US2020/014703 dated Apr. 24, 2020.
(Continued)

*Primary Examiner* — Meless N Zewdu
(74) *Attorney, Agent, or Firm* — Marshall, Gerstein & Borun LLP

(57) ABSTRACT

Methods, systems, and non-transitory computer readable media for intelligent steering of roaming of user equipment. More particularly, the methods include receiving, from a user equipment (UE) located in a visitor network, a registration message to register with a home network, the registration message including an identifier of the UE. The methods also include querying, by one or more processors, a steering controller using the identifier of the UE to obtain a roaming list customized for the UE. The methods also include pushing, by one or more processors, the roaming list to the UE.

16 Claims, 3 Drawing Sheets

(58) Field of Classification Search
CPC ......... H04W 64/006; H04W 36/00835; H04W 88/18; H04W 92/02; H04M 15/8038; H04M 2215/7442; H04M 3/4874; G06F 9/44505; G06F 9/4451; G06F 2221/2117; G06F 9/44542
See application file for complete search history.

(56) References Cited

U.S. PATENT DOCUMENTS

| | | | |
|---|---|---|---|
| 2007/0184825 A1* | 8/2007 | Lim et al. | 455/422.1 |
| 2007/0191006 A1 | 8/2007 | Carpenter | |
| 2007/0281694 A1* | 12/2007 | Lin et al. | 455/435.2 |
| 2011/0021195 A1 | 1/2011 | Cormier et al. | |
| 2011/0195711 A1* | 8/2011 | Bergqvist et al. | 455/433 |
| 2011/0217979 A1 | 9/2011 | Nas et al. | |
| 2015/0215769 A1* | 7/2015 | Schwalb | H04W 8/12 |
| 2015/0230077 A1* | 8/2015 | Sparks et al. | H04W 8/10 |
| 2015/0256993 A1* | 9/2015 | Bellamkonda | H04W 8/06 |
| 2018/0352493 A1* | 12/2018 | Strater et al. | H04W 36/30 |
| 2020/0077251 A1* | 3/2020 | Lumatis | H04W 8/003 |

OTHER PUBLICATIONS

Written Opinion for PCT/US2020/014703 dated Apr. 24, 2020.
Gemalto: "SoR as a service in 5GC", 3GPP Draft; C1-190340, 3rd Generation Partnership Project (3GPP), Mobile Competence Centre, published Jan. 14, 2019.
Orange et al.: "SoR call flow corrections in 23.122", 3GPP Draft; CP-193092, 3rd Generation Partnership Project (3GPP), Mobile Competence Centre; 650, Route Des Lucioles; F-06921 Sophia-Antipolis Cedex; France, published Dec. 2, 2019.

\* cited by examiner

INTELLIGENT STEERING OF ROAMING FOR USER EQUIPMENT

CROSS-REFERENCE TO RELATED APPLICATIONS

The present application claims priority to U.S. Provisional Application No. 62/795,924 filed Jan. 23, 2019, the entirety of which is incorporated by reference herein.

BACKGROUND

Network operators provide network services to user equipment (UEs) located within their network footprint (i.e., their "home network"). To expand network coverage, network operators often partner with other network operators associated with respective network footprints (i.e., "visitor networks"). Accordingly, the network operator's customers have network connectivity when their UE is located in a visitor network (i.e., the UE is "roaming"). To select the networks on which the UE is configured to connect, the UE maintains a configurable roaming list that identifies the relative priority for various visitor network. When the UE is located outside of the home network, the UE analyzes the roaming list and attempts to connect to a visitor network in accordance with the priority set forth in the roaming list.

When a UE attempts to register with a network, traditional networks are configured to provide the roaming list via an over-the-air (OTA) interface implemented via a short message service (SMS) protocol. However, the OTA interface is unreliable, particularly while the UE is roaming. For example, because visitor networks collect fees when a home network UE is connected to the visitor network, visitor networks may try to block attempts by the home network to steer the UE onto another visitor network. Accordingly, visitor networks often intercept SMS messages associated with the OTA interface. Additionally, most OTA interfaces are cumbersome and do not enable traditional network operators to dynamically alter their network lists. Thus, traditional network operators are restricted in their ability to steer UE onto their preferred visitor networks. Inadequate steering can result in inferior network selection for users and network congestion.

SUMMARY

In one embodiment, a computer-implemented method is provided. The method includes (1) receiving, from a user equipment (UE) located in a visitor network, a registration message to register with a home network, the registration message including an identifier of the UE; (2) querying, by one or more processors, a steering controller using the identifier of the UE to obtain a roaming list customized for the UE; and (3) pushing, by one or more processors, the roaming list to the UE.

In another embodiment, a computer-implemented method is provided. The method includes (1) periodically obtaining, from a steering controller, a customized roaming list generated based upon a plurality of network usage data associated with one or more visitor networks; (2) receiving, from a user equipment (UE) located in a particular visitor network, a registration message to register with a home network; and (3) pushing, by one or more processors, the customized roaming list to the UE.

In yet another embodiment, a non-transitory storage medium storing computer-executable instructions is provided. The instructions, when executed by one or more processors, cause the one or more processors to (1) receive, from a user equipment (UE) located in a visitor network, a registration message to register with a home network, the registration message including an identifier of the UE; (2) query a steering controller using the identifier of the UE to obtain a roaming list customized for the UE; and (3) push the roaming list to the UE.

DETAILED DESCRIPTION

Figure 1:
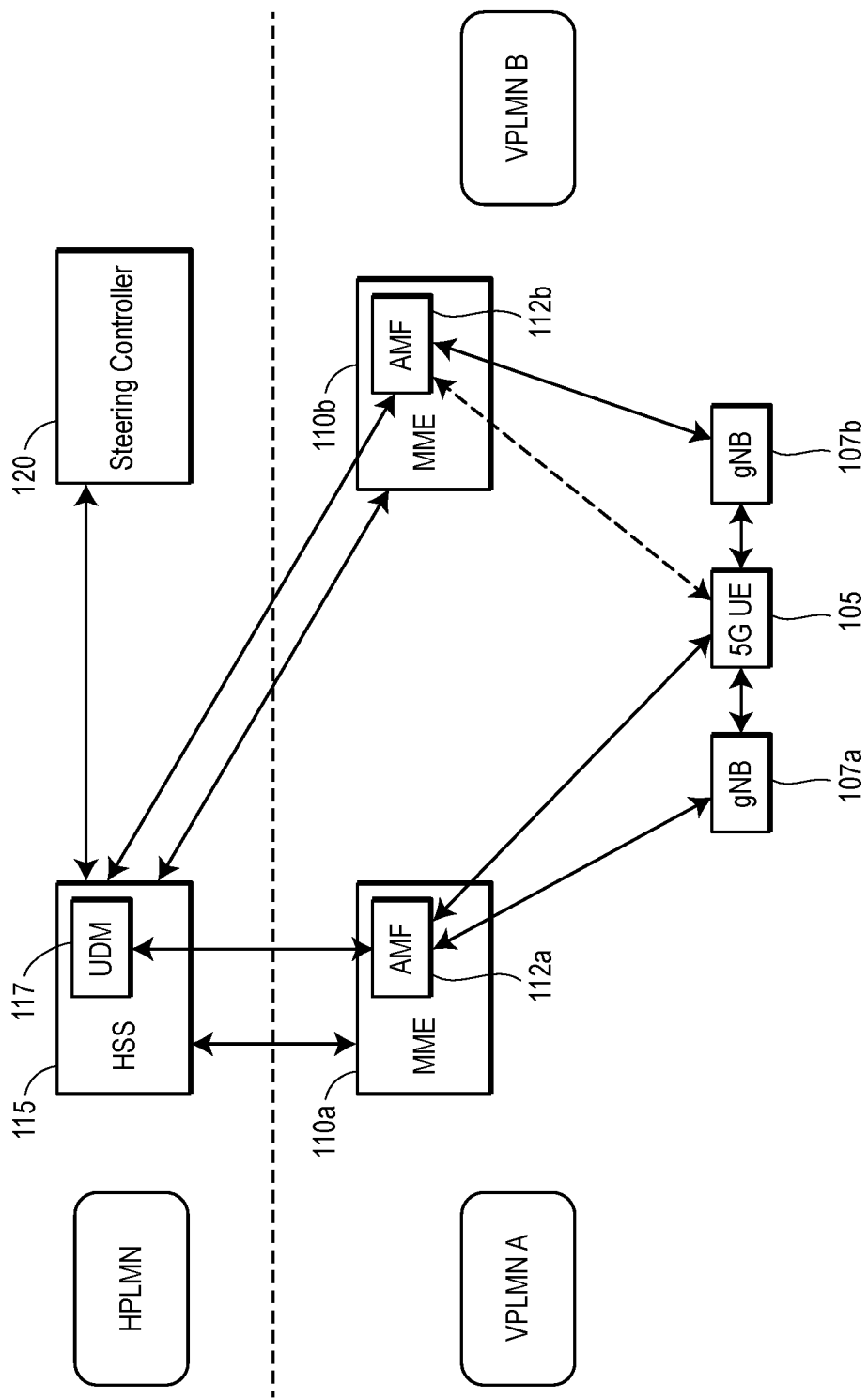
FIG. 1 depicts an example environment in which the steering of roaming techniques described herein are implemented.

FIG. 1 depicts an example environment 100 in which the steering of roaming techniques described herein are implemented. As illustrated, the environment 100 includes a home public land mobile network (HPLMN) and two visitor public land mobile networks (VPLMN A and VPLMN B). The HPLMN include a home subscriber subsystem (HSS) 115 that stores information associated with authentication, authorization, and/or accounting for the various subscribers and their respective UEs (e.g., mobile phones, tablets, smart watches, laptops, mobile access points, internet of things (IoT) devices, and/or any other computing device that includes communication components capable of connecting to the HPLMN). The HSS 115 includes a unified data manager (UDM) 117 that is configured to enforce network operator policy decisions. For example, the UDM 117 may associate a subscriber and/or UE with a particular service plan.

Each of the VPLMNs include a mobility management entity (MME) 110 that may be configured to track a location for each UE connected to the VPLMN and manage inbound and outbound roaming connections between the VPLMN and other networks (such as the HPLMN). As illustrated, the MME 110 includes an access management function (AMF) 112 that controls communications related to connections and mobility. Accordingly, the AMF 112 of the VPLMN is communicatively coupled to the UDM 117 of the HPLMN. More particularly, the UDM 117 may be configured to utilize a Nudm interface that is interoperable with a Namf interface of the AMF 112 via one or more application programming interfaces (APIs).

As illustrated, a UE 105 is connected to the VPLMN A. More particularly, a user plane of the UE 105 is connected to a next generation node B (gNB) 107a of the VPLMN A and the control plane of the UE 105 is connected to the AMF 112a via an N1 interface. When the UE 105 attempts to register with the VPLMN A, the UE 105 sends a registration message over the control plane to the AMF 112a. The AMF 112a then routes the registration message to the UDM 117 which determines whether or not the UE 105 is permitted to connect onto the HPLMN and/or the VPLMN A. The UDM 117 routes the decision back to the AMF 112a for communication back to the UE 105.

In embodiments described herein, the response by the UDM 117 not only includes the decision of whether to allow the UE 105 onto the HPLMN and/or the VPLMN A, but also a roaming list that enforces one or more policy decisions. This roaming list may be communicated over the various control plane interfaces between the UDM 117 and the UE 105. In one scenario, the UDM 117 determines that the UE 105 is permitted to access the HPLMN, but VPLMN B is preferred over VPLMN A. Accordingly, the roaming list communicated by the UDM 117 to the UE 105 may rank VPLMN B above VPLMN A. When the UE 105 receives the roaming list, the UE 105 is configured to disconnect from the current network (in this scenario, VPLMN A) and attempt to reconnect to a network in accordance with the priority indicated in the roaming list. In this scenario, the UE 105 will attempt to connect to VPLMN B by communicating a registration message to the AMF 112*b* of the MME 110*b*. Because in this scenario the UDM 117 granted the UE 105 access to the HPLMN, the UE 105 will be able to connect to the HPLMN while roaming on VPLMN B.

It should be appreciated that because the roaming list is communicated over a control plane interface and not via a SMS interface, the VPLMN A cannot intercept the roaming list push and prevent the UE 105 from connecting to the VPLMN B. Thus, embodiments disclosed herein are able to circumvent anti-steering measures implemented by some VPLMN operators.

As illustrated, the UDM 117 is connected to a steering controller 120 configured to generate roaming lists. The UDM 117 and the steering controller 120 may be configured to communicate via any known communication interface, such as one that implements one of an HTTP interface, an IP interface (including Ethernet), a RESTful web service, and so on. The steering controller 120 may be operatively connected to a database of customer data records (CDRs). In one embodiment, the UDM 117 responds to the AMF 112 routing the registration message to the UDM 117 by interacting with the steering controller 120 to generate the roaming list to be communicated to the UE 105 in. In these embodiments, the UDM 117 may query a steering controller 120 that is configured to determine onto which network the UE 105 is steered. For example, the steering controller 120 may analyze a subscriber type (e.g., a service plan and/or UE capabilities) associated with the UE 105, network traffic conditions, a location of the UE, and/or any on-demand network needs (e.g., a temporary surge in network subscribers due to an event such as a sports match or a concert) to generate a customized roaming list. The steering controller 120 then provides the generated customized roaming list to the UDM 117 to include with the access decision routed to the UE 105.

In another embodiment, the UDM 117 stores a single roaming list that is provided in response to receiving any registration message from the AMF 112. In this embodiment, the steering controller 120 periodically updates the single roaming list stored at the UDM 117. For example, the steering controller 120 may update the roaming list every five minutes, every half hour, every hour, every four hours, or every day. To generate the updated roaming list, the steering controller 120 may analyze current network statistics and/or network statistics during one or more prior update periods.

It should be appreciated that while the environment 100 depicts components commonly associated with a 5G network, alternative embodiments may be implemented in other network architecture, such as a long term evolution (LTE) network. For example, a LTE or 5G network may include an IP multimedia subsystem (IMS) configured to support one or more multimedia services (e.g., Voice over LTE (VoLTE) or voice or new radio (VoNR)). In these embodiments, the IMS may interact with the MME 112 to communicate the decision of whether or not to allow the UE 105 to use the one or more multimedia services and the roaming list over one or more LTE or 5G control plane interfaces.

Figure 2:
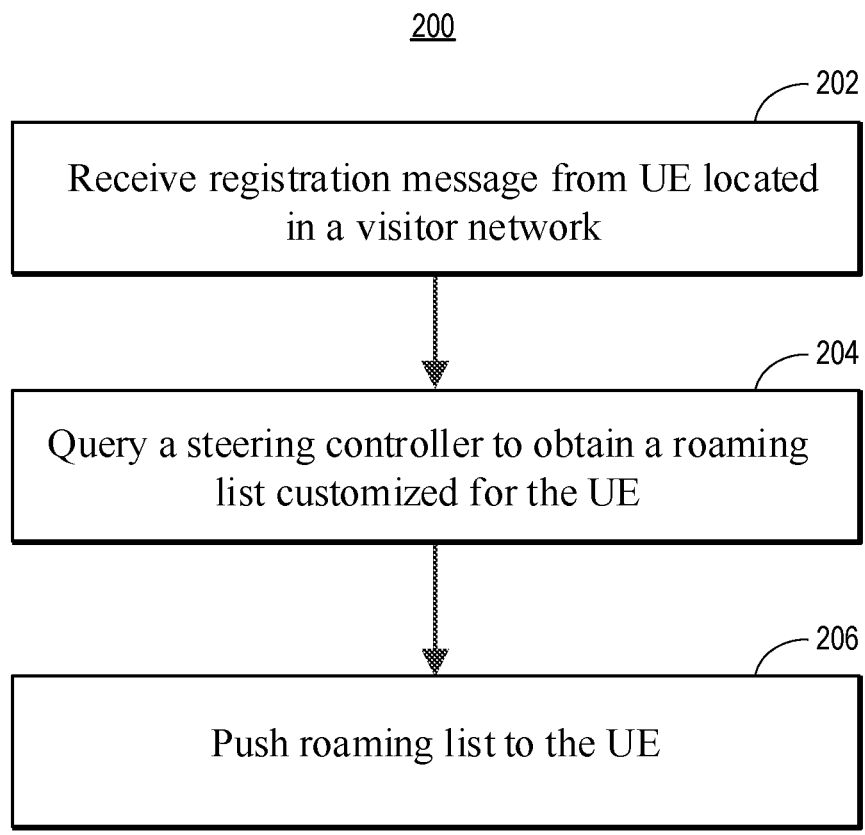
FIG. 2 depicts an example method in which a UDM (such as the UDM 117 of FIG. 1) is configured to generate a customized roaming list in response to a registration message received from a UE located in a visitor network.

Turning now to FIG. 2, an example method 200 is illustrated in which a UDM (such as the UDM 117 of FIG. 1) is configured to generate a customized roaming list in response to a registration message received from a UE (such as the UE 105 of FIG. 1). In scenarios where there are relatively few UEs roaming on a particular visitor network and/or in a particular geographic region, the UDM 117 may be able to customize the roaming list in response to each registration message without significantly delaying the registration process.

The method 200 begins when the UDM 117 receives, from the UE 105 located in a visitor network, a registration message to register with a home network (block 202). The registration message may include an identifier of the UE 105 and/or a location of the UE 105. Accordingly, the UDM 117 may be configured to extract the UE identifier included in the registration message and/or any location information. In some embodiments, because network equipment is generally located at a fixed location, the location of the UE 105 is determined based upon an identifier of a MME (e.g., the MME 110 of FIG. 1) or a gNB (e.g., the gNB 107 of FIG. 1) located in the visitor network.

At block 204, the UDM 117 is configured to query a steering controller (such as the steering controller 120 of FIG. 1) using the identifier of the UE 105 to obtain a roaming list customized for the UE 105. Accordingly, the steering controller 120 may be configured to generate a customized roaming list in response to receiving a query from the UDM 117. In some embodiments, the steering controller 120 analyzes service plan and/or subscriber type to customize the roaming list. For example, if the UE 105 does not support a particular technology and/or feature, the steering controller 120 may exclude networks that implement the particular technology and/or feature. As another example, if the subscriber paid for a premium roaming service, the steering controller 120 may prioritize a particular visitor network associated with high network quality, even if the roaming agreement is more expensive than other co-located visitor networks. In this example, the roaming list generated for another subscriber that is not associated with the premium service plan may not include the particular visitor network or may include the particular visitor network as a lower priority as compared to the other co-located visitor networks.

It should be appreciated many UEs are configured to store the roaming list at a SIM card inserted into the UE. SIM cards generally have limited storage capacity. Accordingly, the UE SIM card may have insufficient storage to store the roaming list for an entire network operator's footprint. Thus, in some embodiments, the UDM 117 includes a location of the UE 105 in the query to the steering controller 120. The steering controller 120 may then utilize the location of the UE 105 to generate a roaming list that only includes visitor networks proximate to the location of the UE 105. This ensures that the UE SIM card has sufficient storage for the customized roaming list.

As another example, the network operator may have contractual obligations to route a certain percentage of roaming traffic in a particular region over a particular visitor network. Thus, the steering controller 120 may be configured to analyze a current subscriber count and/or network traffic usage associated with the visitor networks at the location of the UE 105. For example, the steering controller 120 may access a CDR database to determine the current subscriber count and/or network traffic usage. If the steering controller 120 identifies that the current subscriber count and/or network traffic associated with UEs registered to the home network is below or within a threshold amount of the contractual obligations for a visitor network, the steering controller 120 may prioritize the corresponding visitor network to ensure compliance with the roaming home network operator's roaming agreements.

As yet another example, the UDM 117 and/or the steering controller 120 may determine that the UE 105 is blocked from registering with the home network and/or the current visitor network. In this example, the steering controller 120 may be configured to customize the roaming list such that the current visitor network is a low priority. Therefore, the additional time to process the full roaming list to get to the low priority visitor network reduces the number of registration attempts transmitted by the UE 105, freeing up resources at the UDM 117 and the visitor network.

At block 206, after the UDM 117 has obtained the customized roaming list from the steering controller 120, the UDM 117 is configured to push the customized roaming list to the UE 105. It should be appreciated that the UDM 117 may be configured to push the customized roaming list to the UE 105 without the use of a SMS interface, such as by utilizing one or more control plane interfaces associated with 5G networks.

As described above, when the UE 105 moves onto a new visitor network proximate to the current visitor network, the UE 105 may have already received the appropriately customized roaming list. Accordingly, the UDM 117 does not need to push an updated roaming list to the UE 105 in response to receiving the second registration message from the UE 105 over the proximate visitor network. In some embodiments, to detect that the UE 105 already has the appropriate roaming list for the second registration on the proximate visitor network, the UDM 117 and/or the steering controller 120 may store an indication of the customized roaming list (e.g., an output of a hash algorithm) provided in response to the first registration. If the UDM 117 queries the steering controller 120 on the second registration and the UDM 117 and/or the steering controller 120 determines that the identifier of the second customized roaming list matches the stored indication associated with the UE 105, then the UDM 117 may determine that the UE 105 already has the appropriately customized roaming list. Accordingly, to save network resources, the UDM 117 may be configured to not push the customized roaming list to the UE 105 in response to the second registration message.

Figure 3:
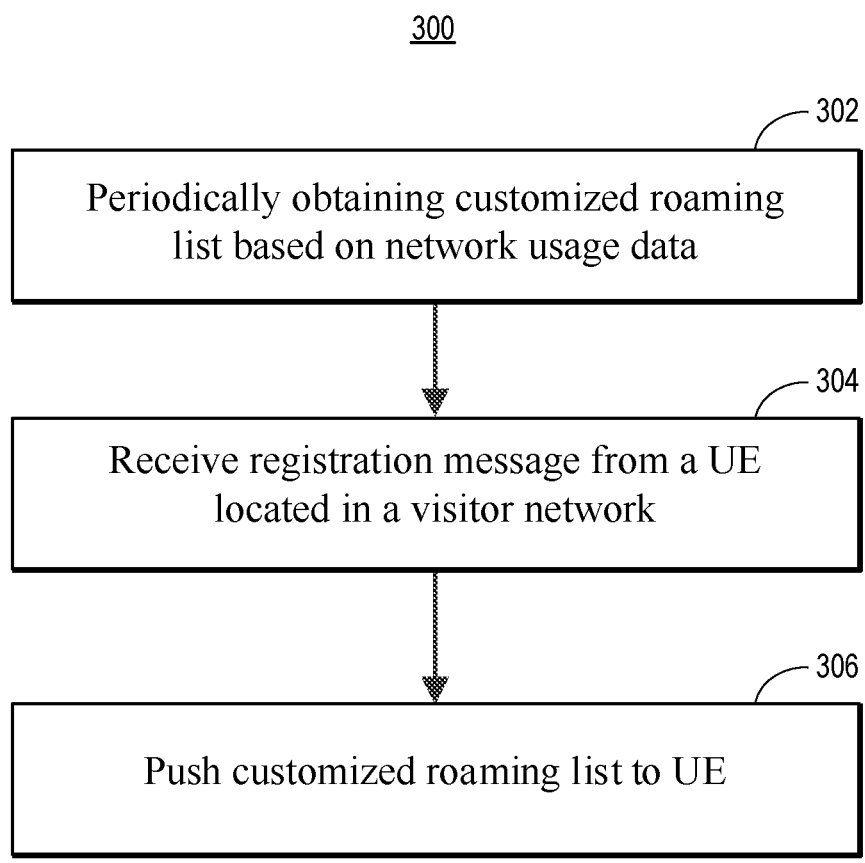
FIG. 3 depicts an example method in which a UDM (such as the UDM 117 of FIG. 1) is configured to periodically generate a customized roaming list to send to UEs that send a registration message while located in a visitor network.

FIG. 3 illustrates an example method 300 in which a UDM (such as the UDM 117 of FIG. 1) is configured to periodically generate a customized roaming list to send to a UE (such as the UE 105) that sends a registration message while located in a visitor network. In scenarios where there are relatively more UEs roaming on a particular visitor network and/or in a particular geographic region, the UDM 117 may periodically generate the customized roaming list to prevent the UDM 117 from dedicating too many resources to generating customized roaming lists on demand.

The method 300 begins with the UDM 117 periodically obtaining, from a steering controller 120, a customized roaming list generated based upon a plurality of network usage data associated with one or more visitor networks (block 302). To this end, the steering controller 120 may be operatively connected to a CDR database that stores the underlying data on which the network usage data is based. In some embodiments, the UDM 117 is configured to periodically poll the steering controller 120 to generate and return the customized roaming list. In other embodiments, the steering controller 120 is configured to periodically generate and push the customized roaming list to the UDM 117. In either scenario, the UDM 117 may be configured to periodically obtain the customized roaming list from the steering controller 120 every five minutes, every half hour, every hour, every four hours, or every day.

To customize the roaming list, the steering controller 120 may access one or more steering requirements indicating a minimum amount of network traffic and/or subscribers for a particular visitor network. Accordingly, the steering controller 120 may be configured to compare the network usage data to the one or more steering requirements. Based on the comparison, the steering controller 120 may be configured customize the roaming list to maintain compliance with the one or more steering requirements. For example, if the current network traffic for a particular visitor network is within a threshold of falling out of compliance, the steering controller 120 may prioritize the particular visitor network in the customized roaming list.

At block 304, the UDM 117 is configured to receive, from the UE 105 located in a particular visitor network, a registration message to register with a home network. The registration message may include an identifier of the UE 105 and/or an indication of a location of the UE 105. The UDM 117 may be configured to modify customized a roaming list based on the identifier of the UE 105 and/or the location of the UE 105, for example, using the techniques described with respect to the method 200.

At block 306, the UDM 117 is configured to push the customized roaming list to the UE 105. It should be appreciated that the UDM 117 may be configured to push the customized roaming list to the UE 105 without the use of a SMS interface, such as by utilizing one or more control plane interfaces associated with 5G networks. The customized roaming list may then be analyzed by the UE 105 to connect to a visitor network based upon the relative priority of the visitor networks in the customized roaming list and the availability of the listed visitor networks.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. For example, in 5G networks, various components may be virtual components distributed across a plurality of servers interconnected to one another and implemented, for example, using a network functions virtualization (NFV) framework. Accordingly, any reference to a 5G network component envisions the logical arrangement of the 5G network component acting as a single function block that is implemented by a plurality of computing devices distributed across a plurality of physical locations of the corresponding network.

Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method to reduce a likelihood of a visitor network intercepting a roaming list pushed to a user equipment (UE), the method comprising:
   receiving, from the UE located in the visitor network, a registration message to register with a home network, the registration message including an identifier of the UE;
   responsive to receiving the registration message:
      querying, by one or more processors, a steering controller using the identifier of the UE to obtain a roaming list customized for the UE; and
   pushing, by the one or more processors the roaming list to the UE over a control plane interface.

2. The computer-implemented method of claim 1, wherein the registration message includes an indication of a location of the UE.

3. The computer-implemented method of claim 2, wherein querying the steering controller comprises:
   querying, by the one or more processors, the steering controller using the location of the UE such that the roaming list is customized based on the location of the UE.

4. The computer-implemented method of claim 1, further comprising:
   determining, by the one or more processors, that the UE is not authorized on the home network; and
   customizing, by one or more processors, the roaming list such that an identifier indicative of the visitor network is a low priority on the roaming list.

5. The computer-implemented method of claim 1, wherein querying the steering controller causes the steering controller to customize the roaming list based upon a count of subscribers registered with a plurality of visitor networks, including the visitor network.

6. A computer-implemented method to reduce a likelihood of a visitor network intercepting a roaming list pushed to a user equipment (UE), the method comprising:
   periodically obtaining, from a steering controller, a customized roaming list generated based upon a plurality of network usage data associated with one or more visitor networks, including the visitor network;
   receiving, from the UE located in a particular visitor network of the one or more visitor networks, a registration message to register with a home network; and
   responsive to receiving the registration message, pushing, by one or more processors, the customized roaming list to the UE over a control plane interface.

7. The computer-implemented method of claim 6, wherein the period for obtaining the customized roaming list is an hour or less.

8. The computer-implemented method of claim 6, wherein obtaining the customized roaming list comprises:
   comparing, by the one or more processors, the plurality of network usage data to a steering requirement for one or more of the visitor networks;
   based on the comparison, customizing, by the one or more processors, the roaming list to comply with the steering requirement.

9. The computer-implemented method of claim 6, wherein the registration message includes an indication of a location of the UE.

10. The computer-implemented method of claim 9, further comprising:
    modifying, by the one or more processors, the customized roaming list based upon the location of the UE.

11. The computer-implemented method of claim 6, further comprising:
    determining, by the one or more processors, that the UE is not authorized on one of the particular visitor network or the home network; and
    modifying, by the one or more processors, the customized roaming list such that an identifier indicative of the particular visitor network is a low priority on the roaming list.

12. A non-transitory storage medium storing computer-executable instructions to reduce a likelihood of a visitor network intercepting a roaming list pushed to a user equipment (UE), the instructions, when executed by one or more processors, cause the one or more processors to:
    receive, from the UE located in the visitor network, a registration message to register with a home network, the registration message including an identifier of the UE;
    responsive to receiving the registration message:
       query a steering controller using the identifier of the UE to obtain a roaming list customized for the UE; and
       push the roaming list to the UE over a control plane interface.

13. The non-transitory storage medium of claim 12, wherein the registration message includes an indication of a location of the UE.

14. The non-transitory storage medium of claim 13, wherein to query the steering controller, the instructions, when executed, cause the one or more processors to:
query the steering controller using the location of the UE such that the roaming list is customized based on the location of the UE.

15. The non-transitory storage medium of claim 12, wherein the instructions, when executed, cause the one or more processors to:
determine that the UE is not authorized on the home network; and
customize the roaming list such that an identifier indicative of the visitor network is a low priority on the roaming list.

16. The non-transitory storage medium of claim 12, wherein querying the steering controller causes the steering controller to customize the roaming list based upon a count of subscribers registered with a plurality of visitor networks, including the visitor network.

* * * * *

UNITED STATES PATENT AND TRADEMARK OFFICE
CERTIFICATE OF CORRECTION

PATENT NO. : 10,972,896 B2
APPLICATION NO. : 16/674842
DATED : April 6, 2021
INVENTOR(S) : Romil Sood et al.

Page 1 of 1

It is certified that error appears in the above-identified patent and that said Letters Patent is hereby corrected as shown below:

In the Claims

At Column 7, Line 53, "processors" should be -- processors, --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*